United States Patent [19]

Tanaka et al.

[11] 3,886,254
[45] May 27, 1975

[54] METHOD OF MAKING CERAMIC SINTERED BODY

[75] Inventors: Hiroshi Tanaka, Yatomi; Yoshihiro Yamamoto, Komaki, both of Japan

[73] Assignee: NGK Spark Plug Co., Ltd., Nagoya City, Japan

[22] Filed: Sept. 24, 1973

[21] Appl. No.: 400,147

[30] Foreign Application Priority Data
Oct. 6, 1972 Japan.............................. 47-100999

[52] U.S. Cl. ................. 264/332; 51/309; 106/39.8; 106/73.3; 264/60; 264/65
[51] Int. Cl............................................. C04b 35/70
[58] Field of Search ........... 106/39.8, 73.3; 264/60, 264/332; 51/309

[56] References Cited
UNITED STATES PATENTS

| | | | |
|---|---|---|---|
| 2,496,671 | 2/1950 | Montgomery...................... | 264/332 |
| 2,618,567 | 11/1952 | Comstock ............................ | 51/309 |
| 2,799,912 | 7/1957 | Greger................................. | 51/309 |
| 2,849,305 | 8/1958 | Frost.................................... | 51/309 |

FOREIGN PATENTS OR APPLICATIONS 730,382  3/1966  Canada................................ 51/309

OTHER PUBLICATIONS

King, "Ceramics For Cutting Metals," Ceramic Bulletin, 43, [5], (1964), pp. 395–400.

*Primary Examiner*—Donald J. Arnold
*Assistant Examiner*—John Parrish
*Attorney, Agent, or Firm*—Stevens, Davis, Miller & Mosher

[57] ABSTRACT

A method of making a ceramic sintered body, comprising preparing a powder-mixture consisting of 40 to 80 percent by weight of alumina with or without replacing not more than 2 percent by weight by a grain growth inhibitor, 16 to 40 percent by weight of titanium carbide and 4 to 20 percent by weight of metallic titanium, the total being 100 percent by weight, and hot-pressing said mixture. The mixture is not subjected to a calcination in nonoxidizing atmosphere at a temperature of 600°C to 1,000°C as previously proposed by the inventors, but it is directly subjected to hot-press forming at a high temperature under a high pressure.

2 Claims, No Drawings

METHOD OF MAKING CERAMIC SINTERED BODY

This invention relates to a method of making a ceramic sintered body which is particularly useful for fabricating cutting tool tips, bearings or other articles which must have a high hardness, a strong toughness and an excellent wear resistant property.

A sintered body essentially consisting of alumina with or without containing a minute amount of grain growth inhibitor such as magnesium oxide has a high hardness and an excellent wear resistant property and a possible use for a cutting tool tip for high speed machining and precise finishing operation, but it is poor in toughness and hence it is unsuitable for heavy machining with its accompanying mechanical vibrations and shocks.

It is well known that in order to improve the toughness of the alumina sintered body, not more than 80% by weight of alumina is replaced by titanium carbide. The titanium carbide, however, is thermally too stable so that even if it is subjected to a hot-press forming operation, a sufficiently compacted sintered alumina body including titanium carbide could not be obtained. As a result, the above mentioned replacement has not gained acceptance in actual practice.

The inventors once proposed a method of making a hard ceramic sintered body comprising the steps of preparing a powder-mixture essentially consisting of 40 to 80 percent by weight of alumina with or without replacing not more than 2 pervent by weight of the alumina with a grain growth inhibitor such as MgO and adding 16 to 40 percent by weight of titanium carbide, calcinating the mixture in a nonoxidizing atmosphere at a temperature of 600°C to 1,000°C and finally hot-press forming the calcined powders.

Although this prior art method can significantly improve the toughness which has been a key point of the conventional ceramic bodies containing a large amount of alumina, it has now been discovered, however, that such ceramic sintered body made by this prior art technique can not be used as a cutting tool tip for a high speed, superprecise machining operation whose feed and cutting depth are extremely small since the edge of the cutting tool tip wears off quickly and its wear resistant property is inferior to that of a cermet or ultrahard sintered alloys.

An object of the invention is therefor to provide a method of making a hard ceramic sintered body containing a large amount of alumina, which can improve the wear resistant property of the superprecise cutting tool tip without reducing its toughness which has already been attained by the inventor's prior art method.

A feature of the invention is the provision of an improved method of making a ceramic sintered body comprising preparing a powder-mixture essentially consisting of 40 to 80 percent by weight of alumina with or without replacing not more than 2 percent by weight of the alumina by a grain growth inhibitor, 16 to 40 percent by weight of titanium carbide and 4 to 20 percent by weight of metallic titanium, the total being 100 percent by weight, and hot-pressing the powders at a high temperature under a high pressure.

The present invention omits the calcination in the nonoxidizing atmosphere applied in the above mentioned prior art method and provides a ceramic sintered body which is particularly available for cutting tool tips, bearings or other articles which must have a high hardness, a strong toughness, and an excellent wear resistant property.

The invention will now be explained with reference to a practical example.

PRACTICAL EXAMPLE

A mixture of $\alpha$-$Al_2O_3$ 90 percent of which is of not more than 2.5 $\mu$ in particle diameter, TiC containing 19.2 percent by weight of combined carbon and 0.2 percent by weight of free carbon and having an average particle diameter of 1.5 $\mu$, and Ti having an average particle diameter of 4.5 $\mu$ and a purity of 98.5 percent is prepared in the proportions as shown in Table 1. The mixtures thus prepared are finely powdered in the wet state in a ball mill containing acetone for 50 hours, the acetone is subsequently evaporated within a suitable drier. The powder is then well pestled in a mortar until all the powder particles pass through a screen of 100 meshes and finally the fine powder is hot-pressed within a graphite mold at a temperature of 1,650°C to 1,850°C under a pressure of 200 Kg/cm$^2$ for 15 minutes into a square plate shaped sintered body of 50 mm × 50 mm × 6 mm. The sintered body obtained is cut into small samples A of 13 mm × 13 mm × 5 mm and another small samples B of 8 mm × 4 mm × 2.5 mm. The surface of each sample is ground by a diamond grinder until the surface shows the average roughness height of not more than 3 $\mu$ (0.003 mm). The average particle diameter, density, hardness and wear resistant property of the samples A and the transverse bending strength of the samples B were measured to obtain the results shown in the following Table 1. The corresponding properties of samples made under the same conditions as those described above except the mixture to be sintered is calcined in hydrogen at 800°C for 1 hour prior to the hot-press forming are also listed as reference article in the Table 1.

Table 1

| | | Ceramic Sintered Body according to the invention | | | | | Out of the range defined by the invention | | | | | Reference Article |
|---|---|---|---|---|---|---|---|---|---|---|---|---|
| Sample No. | | 1 | 2 | 3 | *² 4 | *² 5 | 6 | 7 | 8 | 9 | 10 | 11 | 12 |
| Composition (wt%) | Al$_2$O$_3$ | 43 | 61 | 78 | 60 | 50 | 100 | 60 | 60 | 30 | 60 | 43 | 60 |
| | TiC | 51 | 20 | 16 | 36 | 30 | — | 40 | 10 | 40 | 38 | 51 | 36 |
| | Ti | 6 | 19 | 6 | 4 | 20 | — | — | 30 | 30 | 2 | 6 | 4 |
| Sintering Temperature (°C) | | 1,850 | 1,770 | 1,720 | 1,790 | 1,800 | 1,600 | 1,750 | 1,750 | 1,850 | 1,750 | 1,800 | 1,750 |
| Average Particle Diameter ($\mu$) | | 1.85 | 2.03 | 1.90 | 1.89 | 1.92 | 4.52 | 2.53 | 2.08 | 2.21 | 3.03 | 1.81 | 1.88 |
| Density (g/cc) | | 4.41 | 4.33 | 4.18 | 4.35 | 4.40 | 3.99 | 4.20 | 4.12 | 4.30 | 4.15 | 4.41 | 4.31 |
| Rockwell Hardness Superficial 45-N | | 91.8 | 91.9 | 92.0 | 92.8 | 92.1 | 88.5 | 89.0 | 88.5 | 89.8 | 89.5 | 90.0 | 92.6 |
| Transverse Bending Strength (Kg/mm$^2$) | | 80 | 79 | 78 | 71 | 69 | 40 | 33 | 25 | 31 | 42 | 78 | 72 |

Table 1 – Continued

|  |  | Ceramic Sintered Body according to the invention |  |  |  |  | Out of the range defined by the invention |  |  |  |  | Reference Article |  |
|---|---|---|---|---|---|---|---|---|---|---|---|---|---|
| Machin-ability | *1 Lapse of time until cutting tool edge becomes broken (second) | 180< | 180< | 180< | 180< | 180< | 5 | 20 | 3 | 4 | 72 | 180< | 180< |
|  | *3 Life of precise cutting Number of works) | 80 | 98 | 86 | 89 | 99 | 29 | 41 | 29 | 23 | 35 | 44 | 43 |

Note: *1 Cutting tool edge break test:
A ceramic sintered body is formed into a cutting tool (throw-away type SNP 432) by which a cast iron bar (Brinell hardness 170) of 120 φmm × 400 1mm cut in its lengthwise direction with eight grooves each having a width of 5 mm is turned at a cutting speed of 250 m/min with a cutting depth of 1.0 mm and a feed of 0.2 mm/rev. for 180 seconds.

*2 0.5 part by weight of 100 parts by weight of main ingredient $Al_2O_3$ is replaced by MgO

*3 Precise cutting test:
A ceramic sintered body is formed into a cutting tool (throw-away type SNP 432) by which a cast iron cylinder (Brinell hardness 280) whose inner diameter is 110 φmm and length is 280 mm is bored at a cutting speed of 300 m/mm with a cutting depth of 0.2 mm and a feed of 0.2 mm/rev. Precise cutting life of the tool is determined by the number of cylinders bored through, by the time the bored cylinder differs from the first one in inner diameter by 0.04 mm.

As seen from the above Table 1, the ceramic sintered body according to the invention is significantly improved in not only the density, hardness, transverse bending strength but also the machinability of the cutting tool if compared with $Al_2O_3$ per se, $Al_2O_3$-TiC or other ceramic sintered bodies having compositions which are out of the range defined by the present invention. In addition, the ceramic sintered body according to the invention is improved in its machinability of the cutting tool without lowering its transverse bending strength and it is capable of performing a high speed superprecise machining when compared with the ceramic sintered bodies listed in the above Table 1 as reference articles have the same in composition as the ceramic sintered body according to the invention, but which are subjected to the inventors' prior art calcination treatment in a non-oxidizing atmosphere at 800°C for 1 hour.

The reasons why the ceramic sintered body according to the invention essentially consisting of $Al_2O_3$ and containing TiC and Ti yields the above mentioned surprising results are as follows. When the fine powder is hot-press formed, a part of Ti which is a transition metal reacts with the free carbon or with carbonic acid gas in the graphite mold not to produce lower oxides which make the sintered body brittle, but to produce sub-carbide which combines well with $Al_2O_3$. The remainder of Ti diffuses into $Al_2O_3$ to increase the strength of the sintered body.

In addition, the reasons why the above mentioned omission of the inventors' prior art calcination of the powders to be sintered can significantly improve the wear resistant property of the sintered body whilst maintaining its transverse bending strength are as follows. Since the calcination is omitted, the surface of $Al_2O_3$ is not covered with lower oxides e.g., TiO, $TiO_2$ and as a result, the surface of the alumina particles has a property which is substantially the same as that of pure alumina. The reason why the ceramic sintered body according to the invention is improved in its superprecise machinability is therefore due to the fact that the surface of $Al_2O_3$ particles according to the invention is not covered with the undesired lower oxide and the ceramic sintered body according to the invention has an excellent wear resistant property.

The surface of $Al_2O_3$ particles covered with the lower oxide causes a deterioration of the sintered body particularly when the sintered body is used as a cutting tip in the superprecise machining operation.

In the present invention, $Al_2O_3$ is limited to 40 to 80 wt percent and TiC is limited to 16 to 40 wt percent. Because, as seen from the Table 1, the use of not more than 40 wt percent of $Al_2O_3$ causes the amount of TiC to excessively increase, and as a result, it is impossible to significantly manifest the hardness and wear resistant property inherent to $Al_2O_3$ and the use of not more than 16 wt percent TiC causes the amount of $Al_2O_3$ to excessively increase, and as a result, it is impossible to improve the toughness of the ceramic sintered body. In addition, the reasons why the amount of Ti is limited to 4 to 20 wt percent such that the total amount of the mixture of $Al_2O_3$ and TiC added with Ti becomes 100 percent are as follows. If the amount of Ti is not more than the lower limit of 4 wt percent, the sufficient effect of Ti added can not fully be manifested, while if the amount of Ti is not less than the upper limit of 20 wt percent, when the fine powder is hot-pressing, pores are produced in the sintered body and these pores make the sintered body brittle.

Although the ceramic sintered body according to the invention essentially includes 40 to 80 percent by weight of $Al_2O_3$, a part of the $Al_2O_3$, that is, not more than 2 wt percent of $Al_2O_3$ may be replaced by MgO or oxides of lanthanide rare earth elements which can play a role of a grain growth inhibitor, as has been conventionally practiced. In the sample Nos. 4, 5 and 12 shown in Table 1, 0.5 part by weight of 100 parts by weight of $Al_2O_3$ is replaced by MgO. The pressure with respect to the hot-press forming mentioned above may be varied from 100 to 300 Kg/cm², and the pressing time from 10 to 60 minutes, as would be apparent to

What is claimed is:

1. A method of making a ceramic sintered body, comprising preparing a powder-mixture consisting essentially of 40 to 80 percent by weight of alumina 16 to 40 percent by weight of titanium carbide and 4 to 20 percent by weight of titanium and hot pressing the mixture at a temperature of from about 1720° to 1850°C and under a pressure of from about 100 to 300 kg/cm².

2. A method of making a ceramic sintered body, comprising preparing a powder-mixture consisting essentially of 40 to 80 percent by weight of alumina, 16 to 40 percent by weight of titanium carbide which contains a trace of free carbon, and 4 to 20 percent by weight of titanium, and hot pressing the mixture within a mold of graphite at a temperature of from about 1720° to 1850°C and under a pressure of from about 100 to 300 kg/cm² for 10 to 60 minutes so as to make a portion of the titanium react with the free carbon and to form sub-titanium carbide which combines well with the alumina.

* * * * *